(12) United States Patent
Wiser et al.

(10) Patent No.: US 7,356,532 B2
(45) Date of Patent: Apr. 8, 2008

(54) SYSTEMS AND METHODS FOR MAINTAINING TRANSACTIONAL PERSISTENCE

(75) Inventors: David Wiser, San Jose, CA (US); Sanjay Dalal, Sunnyvale, CA (US)

(73) Assignee: BEA Systems, Inc., San Jose, CA (US)

( * ) Notice: Subject to any disclaimer, the term of this patent is extended or adjusted under 35 U.S.C. 154(b) by 358 days.

(21) Appl. No.: 11/058,888

(22) Filed: Feb. 16, 2005

(65) Prior Publication Data

US 2005/0149526 A1 Jul. 7, 2005

Related U.S. Application Data

(63) Continuation of application No. 10/447,778, filed on May 29, 2003, now Pat. No. 6,988,099.

(60) Provisional application No. 60/392,237, filed on Jun. 27, 2002.

(51) Int. Cl.
*G06F 17/30* (2006.01)

(52) U.S. Cl. ............. 707/8; 707/9; 707/10; 707/103 R; 711/114; 719/316

(58) Field of Classification Search ................ 707/10, 707/101, 102, 103 R, 8, 9; 705/26; 714/20
See application file for complete search history.

(56) References Cited

U.S. PATENT DOCUMENTS

| 5,321,841 A * | 6/1994 | East et al. ................ 719/330 |
| 5,469,562 A * | 11/1995 | Saether ........................ 714/20 |
| 5,748,975 A | 5/1998 | Van DeVanter ............. 395/793 |
| 5,801,958 A | 9/1998 | Dangelo et al. |
| 5,835,769 A | 11/1998 | Jervis et al. ................. 395/701 |

(Continued)

FOREIGN PATENT DOCUMENTS

CA 2248634 3/2000

(Continued)

OTHER PUBLICATIONS

C. Mohan et al., "ARIES: a transaction recovery method supporting fine-granularity locking and partial rollbacks using write-ahead logging", ACM Transactions on Database Systems (TODS), vol. 17, Issue 1 (Mar. 1992), pp. 94-162.*

(Continued)

*Primary Examiner*—Shahid A Alam
(74) *Attorney, Agent, or Firm*—Fliesler Meyer LLP

(57) ABSTRACT

Messages between trading partners can be processed persistently using a persistence framework, which can include a transaction manager, a locking manager, and a logging mechanism. A transaction manager can initiate a transaction for a request, and can enlist and modify any object or resource useful in processing the request. A locking manager can lock any of these objects, using inflated and/or individual locks, to prevent other resources or transactions from accessing the object during the transaction. A logging component can track any modifications of the object, while a transaction manager can manage state for the object.

This description is not intended to be a complete description of, or limit the scope of, the invention. Other features, aspects, and objects of the invention can be obtained from a review of the specification, the figures, and the claims.

10 Claims, 4 Drawing Sheets

U.S. PATENT DOCUMENTS

| | | | |
|---|---|---|---|
| 5,836,014 A | 11/1998 | Faiman, Jr. | |
| 5,862,327 A | 1/1999 | Kwang et al. | 395/200.33 |
| 5,867,822 A | 2/1999 | Sankar | |
| 5,950,010 A | 9/1999 | Hesse et al. | 395/712 |
| 5,961,593 A * | 10/1999 | Gabber et al. | 709/219 |
| 5,966,535 A | 10/1999 | Benedikt et al. | |
| 6,012,083 A | 1/2000 | Savitzky et al. | |
| 6,016,495 A * | 1/2000 | McKeehan et al. | 707/103 R |
| 6,023,722 A | 2/2000 | Colyer | 709/201 |
| 6,028,997 A | 2/2000 | Leymann et al. | 395/701 |
| 6,029,000 A | 2/2000 | Woolsey et al. | |
| 6,044,217 A | 3/2000 | Brealey et al. | 395/701 |
| 6,067,548 A | 5/2000 | Cheng | 707/103 |
| 6,067,623 A * | 5/2000 | Blakley et al. | 707/9 |
| 6,070,184 A | 5/2000 | Blount et al. | |
| 6,085,030 A | 7/2000 | Whitehead et al. | 395/200.33 |
| 6,092,102 A | 7/2000 | Wagner | |
| 6,119,149 A | 9/2000 | Notani | 709/205 |
| 6,141,686 A | 10/2000 | Jackowski et al. | 709/224 |
| 6,148,336 A | 11/2000 | Thomas et al. | |
| 6,173,442 B1 | 1/2001 | Agesen et al. | |
| 6,185,734 B1 | 2/2001 | Saboff et al. | |
| 6,189,044 B1 | 2/2001 | Thomson et al. | 709/242 |
| 6,212,546 B1 | 4/2001 | Starkovich et al. | |
| 6,222,533 B1 | 4/2001 | Notani et al. | |
| 6,226,675 B1 | 5/2001 | Meltzer et al. | 709/223 |
| 6,230,287 B1 | 5/2001 | Pinard et al. | 714/31 |
| 6,230,309 B1 | 5/2001 | Turner et al. | 717/1 |
| 6,237,135 B1 | 5/2001 | Timbol | 717/1 |
| 6,243,737 B1 | 6/2001 | Flanagan et al. | |
| 6,282,711 B1 | 8/2001 | Halpern et al. | 717/11 |
| 6,311,327 B1 | 10/2001 | O'Brien et al. | |
| 6,324,681 B1 | 11/2001 | Sebesta et al. | 717/1 |
| 6,334,114 B1 * | 12/2001 | Jacobs et al. | 705/26 |
| 6,336,122 B1 | 1/2002 | Lee et al. | 707/204 |
| 6,338,064 B1 * | 1/2002 | Ault et al. | 707/9 |
| 6,345,283 B1 | 2/2002 | Anderson | 707/205 |
| 6,348,970 B1 | 2/2002 | Marx | 358/1.15 |
| 6,349,408 B1 | 2/2002 | Smith | 717/11 |
| 6,353,923 B1 | 3/2002 | Bogle et al. | 717/4 |
| 6,360,221 B1 | 3/2002 | Gough et al. | 707/10 |
| 6,367,068 B1 | 4/2002 | Vaidyanathan et al. | |
| 6,393,605 B1 | 5/2002 | Loomans | 717/121 |
| 6,463,503 B1 | 10/2002 | Jones et al. | |
| 6,530,079 B1 | 3/2003 | Choi et al. | |
| 6,549,949 B1 | 4/2003 | Bowman-Amuah | 709/236 |
| 6,567,738 B2 | 5/2003 | Gopp et al. | |
| 6,594,693 B1 | 7/2003 | Borwankar | 709/219 |
| 6,604,198 B1 * | 8/2003 | Beckman et al. | 713/167 |
| 6,643,652 B2 | 11/2003 | Helgeson et al. | |
| 6,662,357 B1 | 12/2003 | Bowman-Amuah | |
| 6,684,388 B1 | 1/2004 | Gupta et al. | |
| 6,687,702 B2 | 2/2004 | Vaitheeswaran et al. | |
| 6,691,304 B1 | 2/2004 | Zhang et al. | |
| 6,721,740 B1 | 4/2004 | Skinner et al. | |
| 6,721,779 B1 | 4/2004 | Maffeis | |
| 6,732,237 B1 | 5/2004 | Jacobs et al. | |
| 6,735,760 B1 | 5/2004 | Dice | |
| 6,757,689 B2 | 6/2004 | Battas et al. | |
| 6,792,601 B1 | 9/2004 | Dimpsey et al. | |
| 6,795,967 B1 * | 9/2004 | Evans et al. | 719/310 |
| 6,799,718 B2 | 10/2004 | Chan et al. | |
| 6,802,000 B1 * | 10/2004 | Greene et al. | 713/168 |
| 6,804,686 B1 | 10/2004 | Stone et al. | |
| 6,832,238 B1 | 12/2004 | Sharma et al. | |
| 6,836,883 B1 | 12/2004 | Abrams et al. | |
| 6,859,180 B1 | 2/2005 | Rivera | |
| 6,883,026 B1 | 4/2005 | Onodera et al. | |
| 6,918,084 B1 | 7/2005 | Slaughter et al. | |
| 6,922,827 B2 | 7/2005 | Vasilik et al. | |
| 6,959,307 B2 | 10/2005 | Apte | |
| 6,988,099 B2 | 1/2006 | Wiser et al. | |
| 7,000,219 B2 | 2/2006 | Barrett et al. | |
| 7,035,870 B2 | 4/2006 | McGuire et al. | |
| 7,043,722 B2 | 5/2006 | Bau | |
| 7,072,934 B2 | 7/2006 | Helgeson et al. | |
| 7,073,167 B2 | 7/2006 | Iwashita | |
| 7,089,584 B1 | 8/2006 | Sharma | |
| 7,117,214 B2 | 10/2006 | Wiser et al. | |
| 7,117,502 B1 | 10/2006 | Harris | |
| 7,117,504 B2 | 10/2006 | Smith et al. | |
| 7,146,422 B1 | 12/2006 | Marlatt et al. | |
| 7,155,705 B1 | 12/2006 | Hershberg et al. | |
| 7,165,041 B1 | 1/2007 | Guheen et al. | |
| 7,181,731 B2 | 2/2007 | Pace et al. | |
| 7,191,434 B2 | 3/2007 | Renouf | |
| 7,260,599 B2 | 8/2007 | Bauch et al. | |
| 7,260,818 B1 | 8/2007 | Iterum et al. | |
| 2001/0032263 A1 | 10/2001 | Gopal et al. | |
| 2002/0010781 A1 | 1/2002 | Tuatini | |
| 2002/0016759 A1 | 2/2002 | Marcready et al. | |
| 2002/0049788 A1 | 4/2002 | Lipkin et al. | |
| 2002/0073080 A1 | 6/2002 | Lipkin | |
| 2002/0078365 A1 * | 6/2002 | Burnett et al. | 713/200 |
| 2002/0116454 A1 | 8/2002 | Dyla et al. | |
| 2002/0165936 A1 | 11/2002 | Alston et al. | |
| 2002/0169644 A1 | 11/2002 | Greene | |
| 2002/0174178 A1 | 11/2002 | Stawikowski | |
| 2002/0174241 A1 | 11/2002 | Beged-Dov et al. | |
| 2002/0184145 A1 | 12/2002 | Sijaic et al. | |
| 2002/0188486 A1 | 12/2002 | Gil et al. | |
| 2002/0194267 A1 | 12/2002 | Flesner et al. | |
| 2002/0194495 A1 | 12/2002 | Gladstone et al. | |
| 2003/0005181 A1 | 1/2003 | Bau, III et al. | |
| 2003/0018665 A1 | 1/2003 | Dovin et al. | |
| 2003/0018832 A1 | 1/2003 | Amirisetty et al. | |
| 2003/0018963 A1 | 1/2003 | Ashworth et al. | |
| 2003/0023957 A1 | 1/2003 | Bau et al. | |
| 2003/0041198 A1 * | 2/2003 | Exton et al. | 710/200 |
| 2003/0046266 A1 | 3/2003 | Mullins et al. | |
| 2003/0074217 A1 | 4/2003 | Beisiegel et al. | |
| 2003/0074467 A1 | 4/2003 | Oblak et al. | |
| 2003/0097360 A1 | 5/2003 | McGuire et al. | |
| 2003/0110117 A1 | 6/2003 | Saidenberg et al. | |
| 2003/0233631 A1 | 12/2003 | Curry et al. | |
| 2004/0025169 A1 | 2/2004 | Wiser et al. | |
| 2004/0068568 A1 | 4/2004 | Griffin et al. | |
| 2004/0103406 A1 | 5/2004 | Patel | |
| 2004/0133660 A1 | 7/2004 | Junghuber et al. | |
| 2004/0225995 A1 | 11/2004 | Marvin et al. | |
| 2005/0144170 A1 | 6/2005 | Wiser et al. | |
| 2006/0143429 A1 | 6/2006 | Nishiyama et al. | |

FOREIGN PATENT DOCUMENTS

| | | | |
|---|---|---|---|
| WO | WO 99/23558 | * | 5/1999 |
| WO | WO 0029924 | | 5/2000 |
| WO | 01/90884 A2 | | 11/2001 |

OTHER PUBLICATIONS

Supplementary European Search Report for EP 02784131.1 dated Aug. 8, 2007, 4 pages.

Sharma, "J2EE Connector Architecture Specification, Version 1.0 Final Release", Java 2 Enterprise Edition, Aug. 2001, 90 pages, Sun Microsystems.

Allamaraju, et al., "Professional Java Server Programming J2EE 1.3 Edition", Sep. 2001, pp. 1009-1057, WROX.

MICROSOFT, "Microsoft.net Framework", Microsoft Corporation, 2001, 54 pages.

Willink, "Meta-Compilation for C ++", University of Surrey, Jan. 4, 2000, 379 pages.

Erich Liebmann, et al., "Adaptive Data Dissemination and Caching for Edge Service Architectures Built with the J2EE", Mar. 2004, ACM Press, 2004 ACM Symposium on Applied Computing, pp. 1717-1724.

Blake; Rule-Driven Coordination Agents: "A Self-Configurable Agent Architecture for Distributed Control" IEEE, Mar. 2001, pp. 271-277.

Dahalin et al., "Workflow Interoperability Using Extensible Markup Language (XML)", IEEE, Jul. 2002, pp. 513-516.

Kunisetty, Workflow Modeling and Simulation Using and Extensible Object-Oriented Knowledge Based Management System, CiteSeer. 1996 pp. 1-60.

Lauer, Christophe "Introducing Microsoft DotNet" Jul. 2, 2002, pp. 4-5.

Van Der Aalst et al., Verification of XRL: An XML-Based Workflow Language, IEEE, Jul. 2001, pp. 427-432.

Kunisetty, "Workflow Modeling and Simulation Using an Extensible Object-Oriented Knowledge Base Management System" CiteSeer, 1996, pp. 1-60.

Van Der Aalst et al., "Verification of XRL: An XML-Based Workflow Language" IEEE, Jul. 2001, pp. 427-432.

Blake, "Rule-Driven Coordination Agents: A Self-Configurable Agent Architecture for Distributed Control" IEEE, Mar. 2001; pp. 271-277.

Hewlett-Packard, "HP Application Server" Technical Guide Version 8.0, HP, Nov. 5, 2001, pp. 1-234.

Sun Microsystems, "Iplanet Application Server 6.0 White Paper" iPlanet E-Commerce Solutions, May 25, 2000, pp. 1-104.

Enrique Duvos & Azer Bestavroz, "An Infrastructure for the Dynamic Distribution of Web Application Service"; Department of Computer Sciences Boston University, Dec. 2000. pp. 1-104.

Ed Roman & Richard Oberg; The Technical Benefits of EJB and J2EE Technologies over COM+ and Windows DNA; Enterprises Edition (J2EE) Technologies, Dec. 1999; 1-24.

Marcello Mariucci, "Enterprise Application Server Development Environments"; University of Stuttgard, Oct. 10, 2000; pp. 1-30.

"Introducing Microsoft DotNet"; by ChristopherLauer, Jul. 2, 2002; http://web.archive.org/web/20020702162429/http://www.freevbcode.com/Show/Code.asp?ID=2171; pp. 1-10.

Peltz, "Web Services Orchestration" Hewlett-Packard, Jan. 2003, 20 pages.

Muller, "Event-Oriented Dynamic Adaptation of Workflows: Model, Architecture and Implementation", 2002, 351 pages, University of Leipzig, Germany.

* cited by examiner

SYSTEMS AND METHODS FOR MAINTAINING TRANSACTIONAL PERSISTENCE

CLAIM OF PRIORITY

This application is a continuation of U.S. patent application Ser. No. 10/447,778 entitled "Systems and Methods for Maintaining Transactional Persistence" filed May 29, 2003 now U.S. Pat. No. 6,988,099, which claims priority to U.S. Provisional Patent Application No. 60/392,237, entitled "System and Method for Maintaining Transactional Persistence," filed Jun. 27, 2002, which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/212,303 entitled "Single System User Identity," by Sanjay Dalal et al., filed Aug. 5, 2002.

U.S. patent application Ser. No. 10/404,552 entitled "Collaborative Business Plug-in Framework," by Mike Blevins, filed Apr. 1, 2003.

U.S. patent application Ser. No. 10/404,296 entitled "System and Method for Collaborative Business Plug-ins," by Mike Blevins, filed Apr. 1, 2003.

U.S. Provisional Application Ser. No. 10/271,194 entitled "Application View Component for System Integration," by Mitch Upton et al., filed Oct. 15, 2002.

FIELD OF THE INVENTION

The present invention relates to the persistence of messages passed across a network and/or between entities.

BACKGROUND

Current business-to-business (B2B) messaging systems have various ways to transparently handle stacked transactions. In one such system, a stack counter is incremented each time a transaction is started, and decremented when a commit or rollback method is called for the transaction. If a transaction already exists, the persistence infrastructure for the system will not initiate a new transaction. If the stack counter reaches zero, the transaction is committed or rolled back.

A business workflow component, such as a business process management (BPM) component, can execute B2B code at various locations. BPM components can be based on Enterprise JavaBeans (EJBs), and can be utilized in an EJB container-managed transaction. However, it is not possible for an existing B2B system to hold a transaction across a network "send". Since the end receiving the send may be experiencing performance or network problems, or may just be slow in responding, the B2B system needs to commit the transaction promptly to avoid transaction timeouts. There are also circumstances, such as collocation or third party interoperability cases, where a message can come back into a Java virtual machine (JVM) initiating the send, encounter locks already being held, and result in a deadlock. Since the BPM component has an outstanding EJB transaction, it is not possible for B2B to commit the transaction without violating the constraints of the EJB container.

To resolve this problem, B2B can suspend the BPM transaction and start a new transaction when BPM calls into the B2B layer. B2B can commit when needed, before returning control to BPM, and can resume the BPM transaction. This leads to certain problems, as the suspended BPM transaction is more likely to timeout when resumed, even though the B2B transaction will not timeout. Further, beginning and committing a B2B transaction in the middle of an uncompleted BPM transaction can leave an integration system in an inconsistent state in the event of a system crash. Recovery under these circumstances is not possible.

Persistence is maintained in such systems by using a "shadow" copy of an object. Any changes to be made to an object during a transaction is first done to this shadow copy. If all the changes are processed successfully, the changes are applied to the original copy of the object. If such a system crashes during processing, or if the processing is otherwise unable to complete, the original copy remains unmodified. When the system comes back up, the processing is started again. One undesirable attribute to such an approach is the need for two copies of each object in existence while that object is being processed. This can be a significant drain on system resources, depending on the number of objects and type(s) of operations being conducted.

BRIEF SUMMARY

Systems and methods for maintaining transactional persistence in accordance with embodiments of the present invention can utilize a persistence framework to process a request, such as a business message from a trading partner in a business-to-business messaging system. The persistence framework can include a transaction manager to initiate a transaction for a request, which can initiate and terminate the processing of the request. A transaction manager can enlist and modify any object or resource that might be useful in processing a request. A locking manager can be used to lock any of these objects, preventing other resources or transactions from accessing any object used in processing the request. A logging component can be used to track any modifications of the object made during the processing of the request.

A transaction manager can be used to manage state for an enlisted object during processing. A transaction manager can use the changes tracked by the logging component to undo any modification of the object during processing. A database can be used to store information relating to the request, as well as any object modifications. A transaction manager can store modifications to an object in-memory until those modifications are written to a database or personal data store. Modifications to an object can be written to a database when a transaction completes successfully. Once a transaction is complete, or once an object is no longer needed to process the request, any lock on that object can be released.

A locking manager can apply an inflated lock to any object(s) in the system that might be used to process the request. After applying the inflated lock, the locking manager can attempt to apply an individual lock to each object that might be used to process the request. After an individual lock has been applied to each appropriate object, the inflated lock can be released. If an individual lock cannot be applied to each appropriate object, the locking manager can either keep the inflated lock in place until all appropriate objects come available, or can release the inflated and any individual locks and try again at a later time.

Other features, aspects, and objects of the invention can be obtained from a review of the specification, the figures, and the claims.

DETAILED DESCRIPTION

Figure 1:
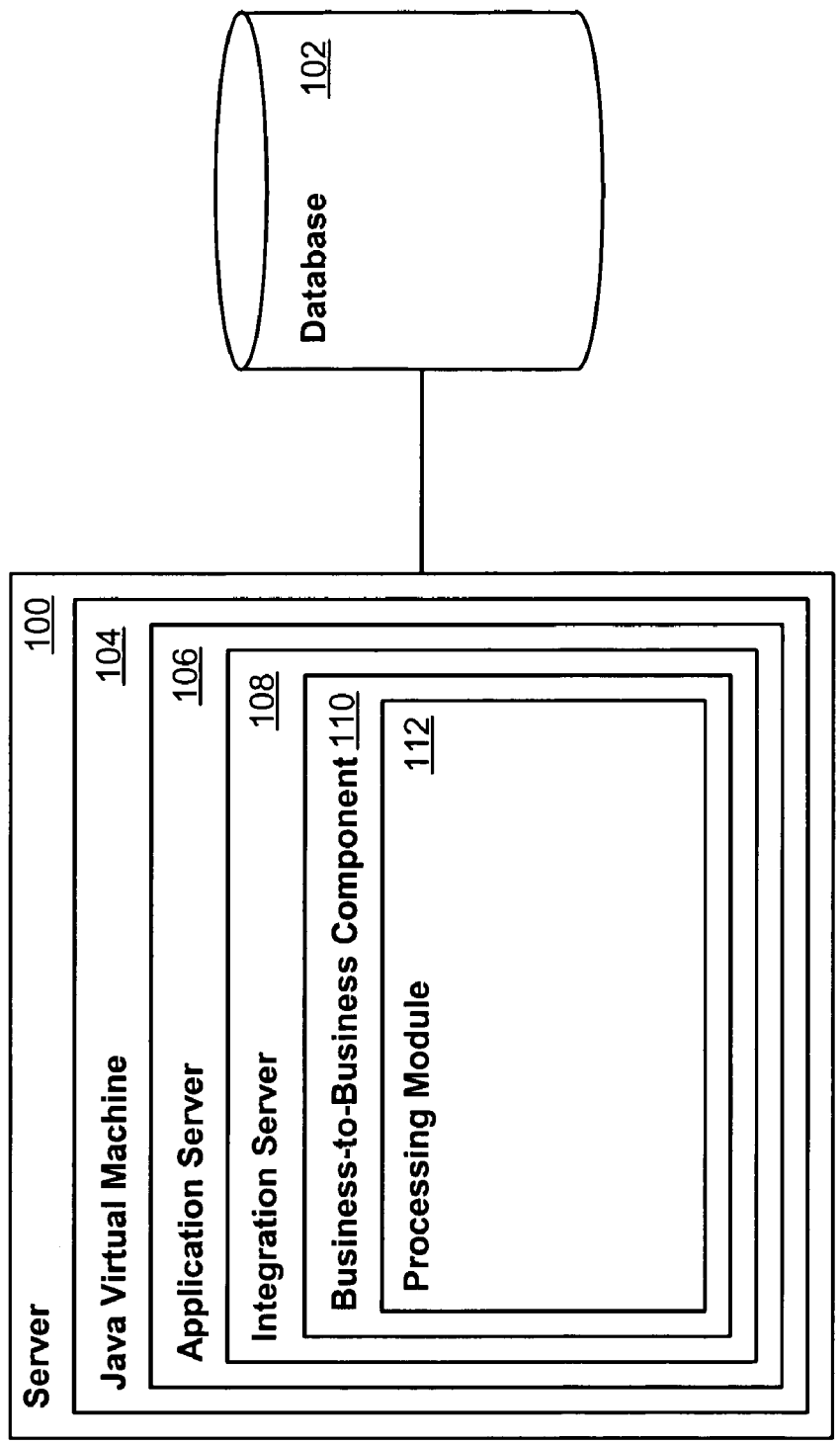
FIG. 1 is a diagram of a server architecture that can be used with a system in accordance with one embodiment of the present invention.

In systems and methods in accordance with various embodiments of the present invention, transactions will normally not be suspended when a code path goes between integration components, such as from a business process management (BPM) component to a business-to-business (B2B) component, in the same thread of execution. Instead, the code for the B2B component can participate in the external transaction. For this approach to solve at least some of the problems mentioned above with respect to prior and existing systems, such an approach can be coupled with certain low-level messaging changes.

A persistence framework, such as may be used with a B2B component of an integration system, can be used to manage state for system resources or objects. Specifically, a persistence framework can be used for recovery purposes in the event of a failure, crash, or unavailability of a system or system component. When an integration system is operational, any unfavorable occurrence, such as a software crash, Java virtual machine (JVM) crash, disk failure, computer failure, or power outage can result in the integration system going down. When the system eventually comes back up, it can be desirable to pick up where the system left off, or where the system was in a process, when the failure occurred. Such a system can pick up at a relatively well-defined point. The system may lose a few seconds overall, but should not cause inconsistencies within the system. The system may need to re-execute certain commands, resend requests, or request commands to be re-executed. If the system has everything it needs, the system can move forward in the execution.

Since a vast majority of transactions can complete successfully, a system can take advantage of this success rate to reduce the strain on system resources. In one embodiment in accordance with the present invention, a persistence framework can be used to allow the system to update the original copy of an object, while allowing for the possibility of roll-back. This can eliminate the need for a shadow copy of the object, while maintaining persistence. Certain processes can require individual control on objects or resources, and during which time no other processes should be allowed to access these objects. A resource can get an exclusive lock on an object, restricting any other resource from accessing the object during processing. Allowing multiple resources to access and modify an object simultaneously can result in improper or incorrect results, as well as inconsistent states, as resources can be modifying states as those states are changing. For instance, if resource A deducts $100 from a $1000 account balance, and resource B deducts $100 from the same $1000 account balance, both could write an account balance of $900, instead of the correct $800 balance that would result if those resources were forced to access the account one at a time.

One potential downside to such an approach is that processing time can be slowed, as multiple resources may need to access an object that is being locked by another resource. Because locks can be short in duration, this can be an acceptable trade-off in many applications. When a resource finishes processing the object, the resource can release the lock and the next resource requesting that object can lock the object for processing. Locks in general can provide guarantees that allow multiple processes to access objects, such as may be in the same database at the same time. Access can be provided in a cooperative, controlled, and predictable manner.

A trading partner using a B2B integration system can have an object in memory on the system that represents that trading partner. An integration system can be an open, standards-based software platform that delivers application server, application integration, business process management, and business-to-business integration functionality to an enterprise. Such an integration system can sit on an EJB platform application server, for example, and can be implemented entirely in Java or any other appropriate language or platform. A trading partner can be a business entity that is authorized to send and receive business messages in a conversation on the system. A business message can be a multipart MIME message, for example, that can consist of business documents, attachments, and message headers.

A conversation can consist of a series of message exchanges between trading partners. A conversation can be defined by a collaboration agreement, which can be a definition of the interactions that trading partners agree to carry out, along with a specification for the methods through which these interactions are conducted. Such a specification can include details about transport, messaging, security constraints, and bindings to a process specification. The choreography of message exchanges can be determined by the conversation definition, which can be part of the collaboration agreement. The conversation definition can include a collection of values that specify the parameters of a conversation.

The configuration for a trading partner can include multiple delivery channels. Another trading partner or resource can get an exclusive lock on the trading partner object, so that operations with that trading partner can be done in a consistent way. A consistent state can be maintained both in-memory and in the database.

The state of the object can be being continually updated in-memory on the system. If something in the processing fails, such as a failure to connect to an external database resulting in an internal exception, the system cannot proceed with processing but cannot leave the processing incomplete. The system can back up in the processing history, undo that which was done during the latest round of processing, and either attempt the processing at a later time or abandon that processing altogether. For instance, if a system crashes while a user is making an on-line purchase, the user may want the ability to either try the purchase again or decide not to make the purchase at all.

A similar approach can be taken to maintain persistence in a database. Database operations can be set up to commit at the end of a round of processing, for example, or at the end of a block of persistent operations. For instance, if a customer wishes to pay several bills online in a single transaction, the account balance in the database can be updated after all the bills to be paid have been identified. This can allow the bank account to be unaffected by any crash during the bill-paying process, while increasing the speed of the transaction by allowing all work to be done in-memory on an original copy of the object representing the account balance. The authorization of bills to be paid can be represented as a block of persistent operations, such that the beginning point and end point of a transaction are well-defined. The persistent operations in the block can be logged for the transaction. The transaction can be rolled back to the point before any bills were paid, which can be consistent with the value in the database. As the end of the transaction is well-defined, the payments can be written to the database once all the bills are identified. After the changes are made, or committed, to the database, the log holding the persistent operations done to the data can be erased.

Certain objects can be identified that may be important for a transaction, such that locks can be applied before starting the transaction. These objects, or resources, can include conversations and trading partners, for example. When a system is about to enter one of the transactional blocks, the system can look to the various objects and resources that are needed for the transaction. Those objects can be locked so they are, or may be, available to the transaction for processing. If all the operations complete successfully, the transaction can be committed to a database, for example, and the locks can be released. If any of the operations do not complete successfully, the transactions in the block can be rolled back. Once rolled back, the transactions in the block can be attempted again, or the locks can be released and the transaction can be attempted later.

In order to keep things relatively simple, resources can be "enlisted" by a transaction. For each important object or resource used in a transaction block for which state needs to be tracked, that resource can be enlisted for that transaction. The processing modules can also take advantage of enlistment mechanisms. These enlistment mechanisms can be used to determine which resources need to be tracked, and which resources need to have logs created and updated. An enlistment mechanism can also indicate the beginning and end of a process to be logged. As an object is tracked, the log can be continually updated so the modifications to the object can be rolled back if necessary. The enlistment mechanism can also track all the logs being kept for that transaction or group of processes.

When a transaction is rolled back, the list of logs can be used to indicate which objects are to be rolled back using the individual logs for those objects. If the processes complete, and nothing is rolled back, the enlistment mechanism can indicate to the objects that the changes are permanent and have been committed to the database. A list of all enlisted objects can be maintained in-memory on the system. At commit time, the system can go through the list of enlisted resources and do the necessary operations for those resources, such as writing to the database or reverting to the original state. For instance, if there are five enlisted resources and only the first four complete successfully, the system at commit time can go back to the four successfully-committed resources and rollback the changes to those resources.

All changes to a resource in a transaction can be recorded in a sequential, in-memory log. These changes can be stored in any appropriate order, such as reverse order, where the last completed operation is the first item in the log. If the transaction needs to be rolled back, the log can be gone through "in order" from top to bottom. The log can also be configured to contain the reverse operation for each operation done to the resources. For instance, if an operation adds $100 to an account balance, the reverse operation stored in the log could be "subtract $100 from account balance." This directive would represent what would need to be done to undo the operation, instead of indicating what was done in the operation.

Framework

A persistence framework can be used to facilitate individual transactions in a messaging or B2B system. An exemplary persistence framework includes at least four primary components, including: a transaction manager, a locking manager, a logging component, and resource data that can be enlisted and de-listed in a transaction. A transaction manager can provide the services and management functions required to support, for example, transaction demarcation, transaction resource management, synchronization, and context propagation.

A locking manager in a persistence framework can utilize two distinct lock types: an inflated or "fat" lock, and an individual or "thin" lock. When a transaction is entered into, the system can implement an inflated lock. The inflated lock can be used to prevent other resources from accessing any of the objects that might be used for the current transaction. The code, or persistence framework, can identify which individual objects under the inflated lock might be needed for that specific transaction. The system can attempt to put a thin lock on each of those individual objects. Once these individual objects are locked with thin locks, the system can release the inflated lock so that other objects or resources can access the objects not used for this specific transaction. The use of an inflated lock can ensure that all resources for a transaction are processed at approximately the same time. If the system cannot place thin locks on all the individual objects that may be needed for the transaction, the system can release the inflated lock and any thin locks for that transaction and try again at a later time. When a thin lock is placed on an object, that object can be modified by the resource locking that object. Any modifications to the object can be tracked, for example, by a persistence framework or a component thereof.

The use of an inflated lock can also reduce the occurrence of "deadlocks." A deadlock can occur, for example, when two resources both attempt to lock objects A and B. If one of the resources locks object A, and the other resource locks object B, then both of the resources will be unable to get the necessary objects for processing the transaction, but may keep the lock on the respective object while attempting to get a lock on the other object. This could result in a deadlock, in which neither of the resources would complete processing.

A "spin lock" or "retry lock" approach can be taken with the inflated lock. If, for example, the inflated lock is unable to access all the necessary objects at one time, the inflated lock can release the objects and try again at a later time. The inflated lock can retry accessing the objects until it is able to lock all the objects that might be used for the processing of the transaction. A different approach would be for the inflated lock to block another resource from accessing any of the objects until all the objects to be locked are released and become available to the resource.

Such an approach to persistence can be used, for example, in a cluster or on a single node. As shown in FIG. 1, persistence code such as a persistence framework can be available on a server 100 in communication with a database 102. Examples of such servers include database management system (DBMS) servers that provides connectivity to a relational database and HTTP servers that provide HTML pages and service HTTP requests. A Java virtual machine (JVM) 104, or other software execution engine, can be running on the server 100. Java can be run or interpreted in the JVM on a particular platform, such as LINUX, UNIX, or Windows 2000. An application server 106 running on the JVM 104 can serve as the foundation for an integration layer 108, which can support business-to-business (B2B) functionality 110. An application server can provide sharing and processing of application logic, as well as a connection to back-end resources. These back-end resources can include databases, ERP applications, and traditional mainframe applications. Application servers can provide user interface development mechanisms, as well as mechanisms to deploy an application to a Web platform. B2B functionality can include, for example, sending messages or handling transactions between trading partners.

Figure 2:
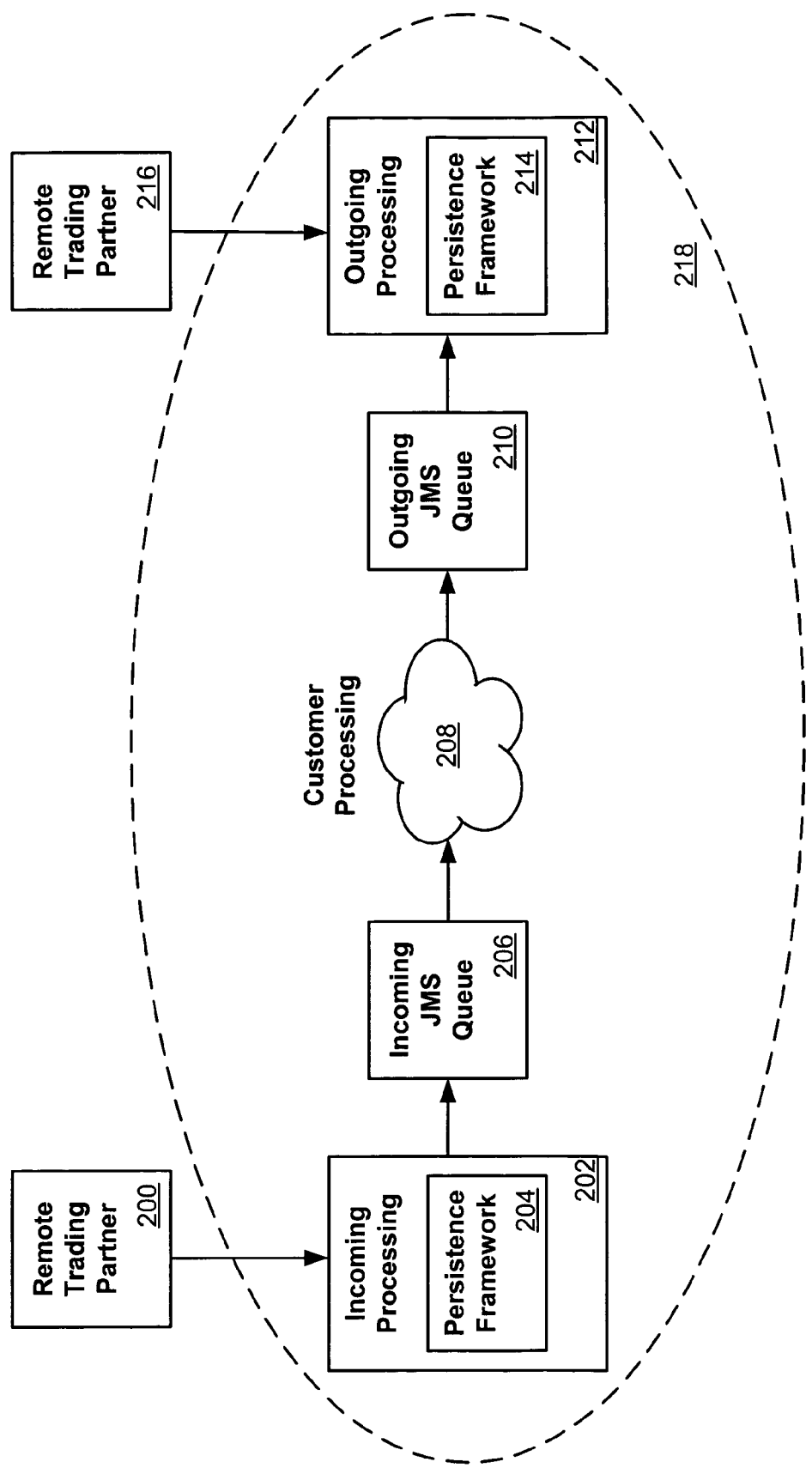
FIG. 2 is diagram of a system that can be used in accordance with one embodiment of the present invention.

FIG. 2 shows one example of how processing modules, similar to that shown in FIG. 1, can be used to process transactions between trading partners. A remote trading partner 200 can send a request to an incoming processing module 202, which can be housed on a server in communication with a database as in FIG. 1. A persistence framework 204 can be running on the incoming processing module, which can provide functionality such as transaction management, object locking, and operation logging. Incoming processing can, for example, determine the sending and receiving trading partners, determine the message format, format a message for processing, and establish conversation parameters. Once a request is processed by the incoming processing module 202, the request can be posted to an incoming JMS queue 206.

The request can reside in the incoming JMS queue 206 until it is extracted for processing, such as by a customer processing module, system, or process 208. Once the request is processed, the request can be passed to an outgoing JMS queue 210, where the request can wait to be passed to a persistence framework 214 on an outgoing processing module 212. Once the request is processed by the outgoing processing module 212, such as being packaged in the appropriate protocol, encrypted, and digitally signed, the message can be sent to the remote trading partner 216. The processing components 202, 208, 212 and JMS queues 206, 210 can be on a single node or contained within a server cluster 218.

The use of JMS queues can provide additional persistence for the transactions. When a message or request is posted to a JMS queue, the thread for that message can be released. Resources can be released more quickly than systems requiring a thread to be held the entire time a message or request is being processed. A JMS queue can also provide for ordered processing, and can significantly reduce the chances of a message being lost. A persistence framework or processing module can simply hand the message off to the JMS queue then go about processing other requests.

When a message is received by an incoming processing module, the message can be in the format used by the trading partner or client sending the request, such as a RosettaNet, XOCP, or ebXML protocol. The incoming processing module can understand the message in its native protocol, and can determine information such as the trading partner or client that is to receive the request, as there may be multiple trading partners or clients for a particular JVM. The persistence framework in the processing module can also track state changes for the message or request.

In the event of a system crash, such as may be due to either a hardware or software problem, a message can get lost while being processed in the incoming processing module. It can be desirable for the sender to be notified that the message was not received properly. If the message was received and processed by the incoming processing module, it can be desirable in the event of a subsequent crash to notify the sender that the message was received. If the system crashes during the outgoing processing, the system can back up one level when the system comes back up. When backed up, the system can see the message residing in the outgoing JMS queue, having not yet been delivered, and can take care of sending the message.

A system can utilize at least two types of logs, including: the afore-mentioned "in-memory" log that is maintained in the memory of a server, as well as a "database" log kept in a database in communication with the server. An in-memory log can be continually updated such that the operations can be rolled back if necessary. An in-memory log can act as a sequential list or one-dimensional array, in that the log is a record of which actions were done and in which order. As mentioned, this log can store either the operations that were done, or the steps necessary to undo those actions. For example, if a value was changed from "true" to "false", the log could contain an entry that says to change the value from false back to true.

Another possible component of a persistence framework, and in particular the transaction management component of the persistence framework, is a list or array of objects that can be used in processing transactions. Such a list can be maintained in a local implementation of a transaction manager, such as in a server housing the incoming and/or outgoing processing modules. If there is a rollback, all the objects in the list can be rolled back. If there is not a roll back, all these objects can be informed that the changes are permanent in the database. A transaction manager can manage these objects on a per-thread basis, as one thread can process a first set of objects while another thread processes another set of objects.

When a message is received from a trading partner or client, a thread can be initiated that is dedicated to processing this message. It is not necessary for the persistence framework to control the thread, but the framework can receive the thread. It can be desirable to ensure the objects that each thread is using, as well as to track those objects for each thread of execution. Only certain threads need to be rolled back in some circumstances, while all threads may need to be rolled back in others. A process can have several threads running concurrently, with each thread performing a different task. A thread can perform tasks such as waiting for events or performing time-consuming tasks that are not needed to move on to processing other tasks. When a thread has finished the relevant task, the thread can be suspended or destroyed.

Figure 3:
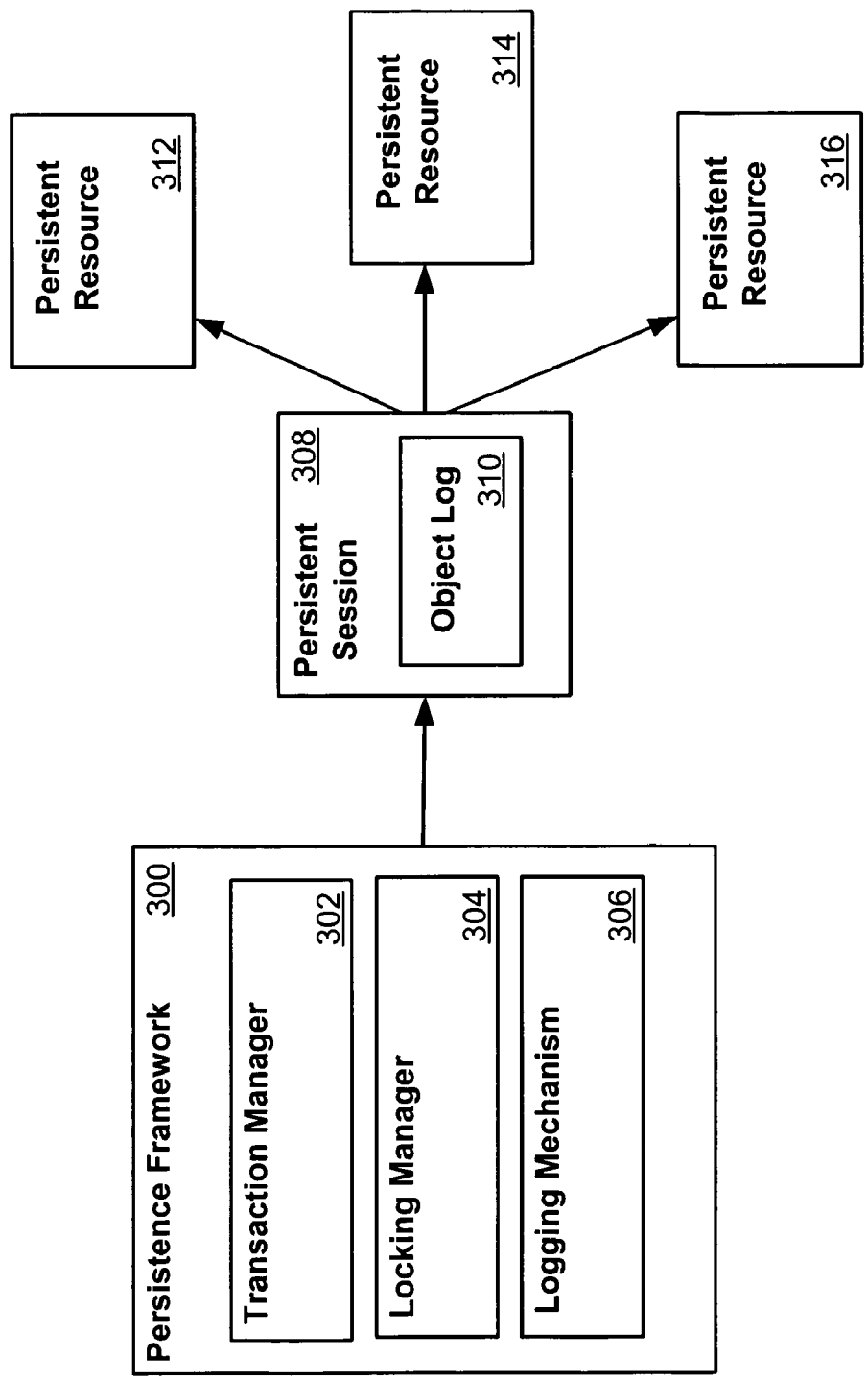
FIG. 3 is a diagram of a persistence framework subsystem that can be used with the system of FIG. 2.

There are other components that can be useful in managing persistence. In a system such as the one shown in FIG. 3, a transaction manager 302 of a persistence framework 300 can initiate and manage a "persistent session" 308, which can keep track of all objects being changed for a given thread. The persistent session can keep track of any enlistable resources 312, 314, 316, and can house the object log 310, which can be created and maintained through the logging mechanism 306. The transaction manager 302 can determine when to begin a transaction, as well as when to commit a transaction. The transaction manager 302 can also direct the locking manager 304 to place locks on the persistent resources 312, 314, 316 during processing. Application code in the persistence framework or transaction manager can determine when a transaction needs to be rolled back. A table of objects involved in a persistent session can be maintained in the persistent session. The table can include a reference to each object, such as an object that is a representation of a trading partner.

A persistence framework 300 can keep track of a number of persistent resources 312, 314, 316 or resource objects. Sequential lists of changes can be maintained in each persistent resource. Persistent resources can include representations of trading partners and conversations, for example. Each persistent resource can be an object that can be enlisted in order to initiate tracking of state.

Transactional changes can be committed to the database if there are no errors in processing a message. Transactional properties can be defined so that operations are processed in a single, logical unit. These operations, when completed, can allow the persistence framework to determine that the message is completed and processed. The persistence framework can notify the sending trading partner, for example, that the message was processed successfully.

Figure 4:
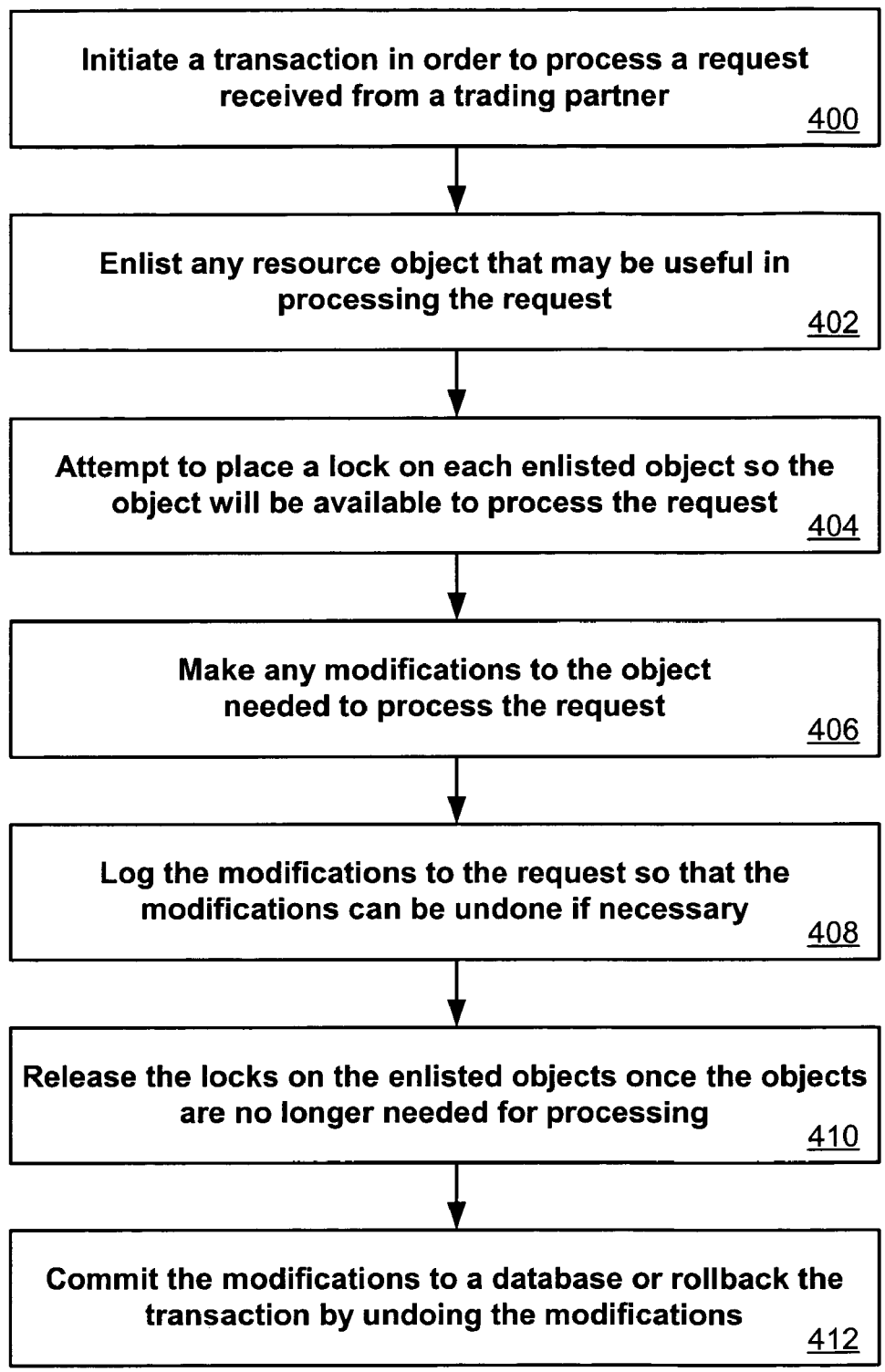
FIG. 4 is a flowchart showing steps of a method that can be used with the system of FIG. 2.

One such method is shown in the flowchart of FIG. 4. When a request or message is received into a messaging system from a trading partner, a transaction can be initiated to process the request in a single block 400. Any resource object that might be useful in processing the request can be enlisted for the transaction 402. A locking manager can attempt to place a lock on each of the enlisted objects so those objects will be available to the transaction 404. During the transaction, any modifications can be made to the objects that are needed to process the request 406. These modifications can be logged so the modifications can be undone, if necessary 408. When the transaction is finished with an object, the lock on that object can be released 410. When the transaction is complete, the modifications can be written to a database if the processing was successful, or can be undone using the information in the log 412.

Such an approach to persistence can apply to stateless point-to-point business protocols, such as ebXML and RosettaNet. The approach can also apply to XOCP transactions, or XOCP transactions can be suspended when coming from BPM. XOCP can have more involved interactions and state management, such that it may be desirable, at least in a short term, to process XOCP in a way that can be more familiar to a user.

Protocols

B2B messaging has been through a number of changes since its inception. Prior systems used JMS queues on the hub, custom lightweight queues on the enabler for XOCP, and did not use queues for RosettaNet endpoints. In other systems, XOCP on both the hub and spokes used a custom database-oriented queuing system. The database was used to help with failover in a cluster. In all these systems, message listeners were used to dequeue messages.

Systems and methods in accordance with embodiments of the present invention may not support RosettaNet for an intermediary or hub. A B2B JMS "send" queue can be used by a RosettaNet encoder when sending a message. This can allow for the decoupling of a BPM transaction from the network send. The ebXML protocol can be handled in a similar fashion, with variations dependent upon whether reliable messaging is used. In all cases, JMS enqueuing can be done within a transaction.

On the sending endpoint, all RosettaNet messages can go through one JMS queue, and all ebXML messages can go through another queue. Implementations of RosettaNet can share a queue. Unlike XOCP, multiple senders can share the same queue. It is not required that there be a separate queue per business protocol, but this can be done to provide additional load balancing.

To provide "RAS" (Reliability, Availability, and Serviceability) capabilities, B2B systems can require the use of distributed JMS destinations within a server cluster. A distributed destination can be a logical queue that is implemented as a physical queue on each cluster node. Certain algorithms can be available to send messages to JMS queues, such as round robin and random algorithms. Round robin can be used by default, with the user able to select another algorithm if desired. A user can also configure weights for the individual cluster nodes in order to adjust the routing for different node capacities. Distributing business messages across queues within a cluster is possible in certain systems because message ordering is not required, due to the nature of the business protocols involved.

Message-driven beans (MDBs) can be used to dequeue messages. This operation can be non-transactional, as an MDB can ultimately be involved in doing the network send of the message. The user can use an administration console to configure additional MDBs if the send queues are not being emptied fast enough. An MDB can also send the status event back to the workflow if this has been requested.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method for persistently processing a request, comprising:
    initiating a transaction to process a request using a transaction manager;
    enlisting any object useful in processing the request;
    locking any object enlisted by the transaction manager;
    modifying the object in order to process the request; and
    logging the modifications to the object; wherein
    an inflated lock is initially placed on objects that potentially are part of the transaction and wherein a thin lock is placed on enlisted objects, further comprising committing the transaction when the request is successfully processed.

2. A method according to claim 1, further comprising:
    storing any modifications to the object during the processing of the request to a database after the request has been processed.

3. A method according to claim 1, further comprising:
    sending the request to a message queue after processing the request.

4. A method according to claim 1, further comprising:
committing the transaction if the request is successfully processed.

5. A method according to claim 1, further comprising:
undoing any logged modifications to the object when the request is not successfully processed.

6. A method according to claim 1, further comprising:
unlocking any locked object after the request is processed.

7. A computer-readable storage medium, comprising:
means for initiating a transaction to process a request using a transaction manager;
means for enlisting any object useful in processing the request;
means for locking any object enlisted by the transaction manager;
means for modifying the object in order to process the request; and
means for logging the modifications to the object; wherein an inflated lock is initially placed on objects that potentially are part of the transaction and wherein a thin lock is placed on enlisted objects, further comprising committing the transaction when the request is successfully processed.

8. A computer program product for execution by a server computer for persistently processing a request, the computer program product stored on a computer readable storage medium, comprising:
computer code to initiate a transaction to process a request using a transaction manager;
computer code to enlist any object useful in processing the request;
computer code to lock any object enlisted by the transaction manager;
computer code to modify the object in order to process the request; and
computer code to log the modifications to the object; wherein an inflated lock is initially placed on objects that potentially are part of the transaction and wherein a thin lock is placed on enlisted objects, further comprising committing the transaction when the request is successfully processed.

9. A computer-based system for persistently processing a request, comprising:
means for initiating a transaction to process a request using a transaction manager;
means for enlisting any object useful in processing the request;
means for locking any object enlisted by the transaction manager;
means for modifying the object in order to process the request; and
means for logging the modifications to the object; wherein an inflated lock is initially placed on objects that potentially are part of the transaction and wherein a thin lock is placed on enlisted objects, further comprising committing the transaction when the request is successfully processed.

10. A computer system comprising: a processor;
object code executed by said processor, said object code configured to:
initiate a transaction to process a request using a transaction manager;
enlist any object useful in processing the request;
lock any object enlisted by the transaction manager;
modify the object in order to process the request; and
log the modifications to the object; wherein an inflated lock is initially placed on objects that potentially are part of the transaction and wherein a thin lock is placed on enlisted objects, further comprising committing the transaction when the request is successfully processed.

\* \* \* \* \*

UNITED STATES PATENT AND TRADEMARK OFFICE
CERTIFICATE OF CORRECTION

PATENT NO. : 7,356,532 B2  
APPLICATION NO. : 11/058888  
DATED : April 8, 2008  
INVENTOR(S) : Wiser et al.

Page 1 of 1

It is certified that error appears in the above-identified patent and that said Letters Patent is hereby corrected as shown below:

Title page 2, in column 1, under "U.S. Patent Documents", line 1, after "Faiman, Jr." insert -- 395/707 --.

Title page 2, in column 1, under "U.S. Patent Documents", line 25, after "Notani et al." insert -- 345/329 --.

Title page 2, in column 1, under "U.S. Patent Documents", line 44, after "Jones et al." insert -- 711/114 --.

Title page 2, in column 1, under "U.S. Patent Documents", line 57, after "Jacobs et al." insert -- 711/119 --.

Signed and Sealed this

Eleventh Day of May, 2010

David J. Kappos
*Director of the United States Patent and Trademark Office*